United States Patent
Du et al.

(10) Patent No.: US 7,260,824 B2
(45) Date of Patent: Aug. 21, 2007

(54) SYSTEM AND METHOD FOR FACILITATING TV CHANNEL PROGRAMMING

(75) Inventors: Vincent Du, San Diego, CA (US); Sabrina Yeh, Laguna Beach, CA (US); Marcelo Katsuzo Goto, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 336 days.

(21) Appl. No.: 10/383,406

(22) Filed: Mar. 7, 2003

(65) Prior Publication Data

US 2004/0177372 A1 Sep. 9, 2004

(51) Int. Cl.
*H04N 5/445* (2006.01)
(52) U.S. Cl. .......................................... 725/59; 348/570
(58) Field of Classification Search ................ 725/59, 725/56, 49; 348/570
See application file for complete search history.

(56) References Cited

U.S. PATENT DOCUMENTS

| 5,926,207 A * | 7/1999 | Vaughan et al. ............. 725/139 |
| 6,529,680 B1 * | 3/2003 | Broberg ....................... 386/83 |
| 6,600,522 B1 * | 7/2003 | Kim ............................ 348/732 |
| 6,642,939 B1 * | 11/2003 | Vallone et al. .............. 715/721 |
| 6,772,433 B1 * | 8/2004 | LaJoie et al. ................ 725/52 |
| 2006/0038926 A1 * | 2/2006 | Mayer et al. ............... 348/731 |

* cited by examiner

*Primary Examiner*—Scott E. Beliveau
*Assistant Examiner*—James Sheleheda
(74) *Attorney, Agent, or Firm*—John L. Rogitz

(57) ABSTRACT

To facilitate programming a TV channel list, only digital channels are presented on an edit list so that the user need not parse through analog channels but only the digital channels to edit the channels (e.g., by putting the channels on a favorite list, or a skip list, or by labelling the channels, etc.).

10 Claims, 2 Drawing Sheets

SYSTEM AND METHOD FOR FACILITATING TV CHANNEL PROGRAMMING

FIELD OF THE INVENTION

The present invention relates generally to televisions.

BACKGROUND OF THE INVENTION

When a television is initially installed in a user's home after purchase, the tuners of the TV search for what channels are available in the area. Such automatic search and tuning is referred to as "autoprogramming". Upon completion of the search, the television possesses a channel map that indicates which frequencies/channels are available for subsequent tuning when a user selects a channel.

After autoprogramming, a user can edit channels on the channel map to, e.g., put the channels on a favorite list, or a skip list, or to label the channels, etc. However, with the advent of digital televisions and hundreds of channels (2-69 for terrestrial broadcast in the U.S. and 1-125 for cable), digital ones of which might in fact carry several sub-channels, sorting through the edit list can consume an inordinate amount of time. The present invention recognizes that while analog channels might require initial editing once only, digital channels, which might carry sub-channels, can be reconfigured with, e.g., more sub-channels than were originally edited, thus requiring additional editing. Further, digital terrestrial reception quality can vary over time and can also depend on the orientation of the antenna, potentially requiring further editing. A user, however, must still sort through the complete list of all digital and analog channels. The present invention provides the solution herein to ease this burden on the user.

SUMMARY OF THE INVENTION

A method for programming a television with channel information when the television has a digital receiver and an analog receiver includes presenting a visible channel edit list to the user that makes available for editing fewer than all available analog channels, and that lists and makes available for editing substantially all available digital channels. For example, not all analog channels need be listed within the digital channel edit list. The list can be used for editing digital channels on the list, e.g., by designating channels for entry on a favorite channel list, or by designating channels for entry on a channel skip list, or by labelling channels, and so on. A user may generate the edit list by receiving a list of all available channels, and then eliminating the analog channels from the list or grouping them separately from the digital channels.

In another aspect, a TV system includes a TV, an analog receiver associated with the TV for receiving available analog channels, and a digital receiver associated with the TV for receiving available digital channels. A processor is associated with the TV and is coupled to the digital receiver for visually presenting on the TV a digital channel edit list displaying all substantially all digital channels available to the TV without displaying any analog channels that numerically intervene between two digital channels numbers.

In still another aspect, a TV system includes means for presenting a list only of digital channels, regardless of whether analog channels are available for reception by the TV between digital channels on the list. Means are also provided for using the list to edit channels thereon.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
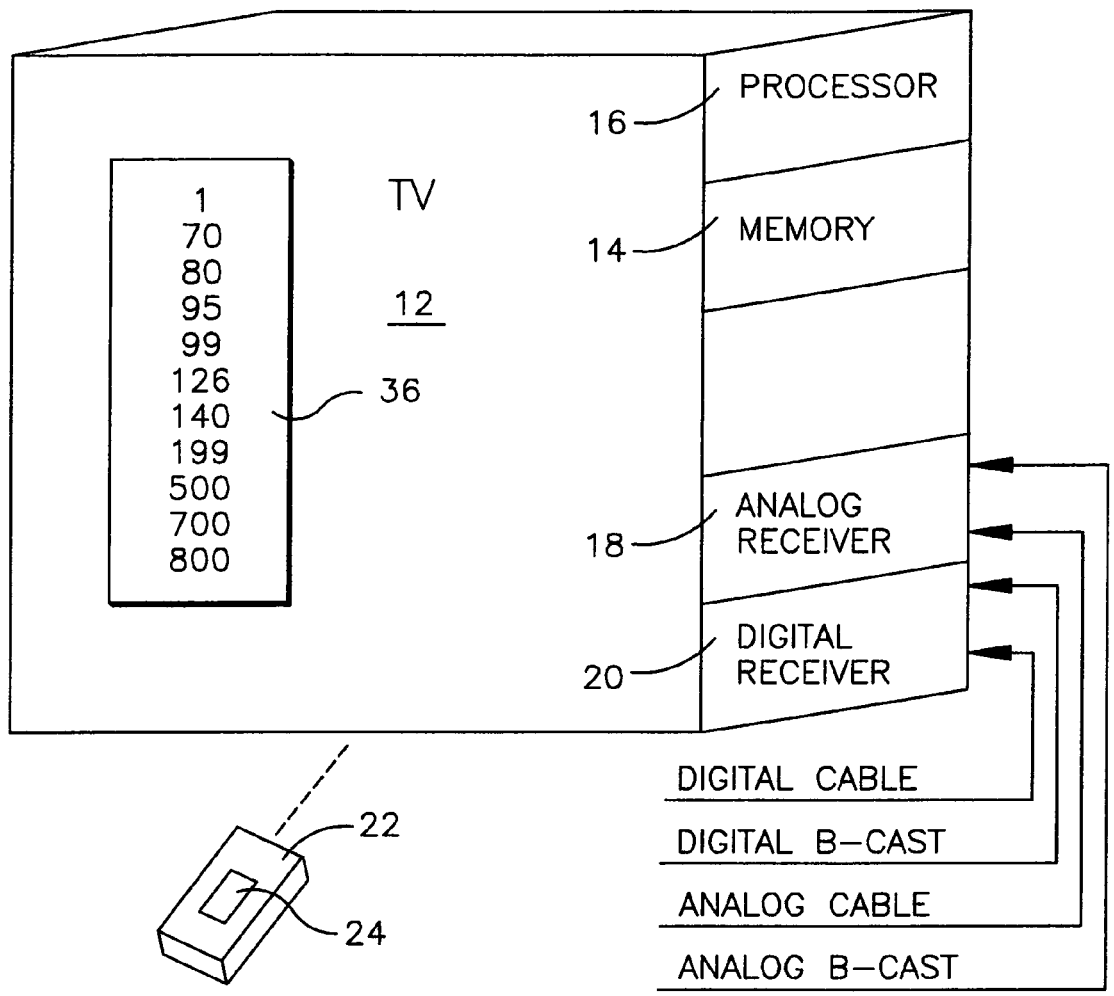
FIG. 1 is a schematic diagram of one exemplary TV with edit list.

Referring initially to FIG. 1, a system is shown, generally designated 10, that includes a television 12, a memory device 14 such as but not limited to solid state memory (RAM, ROM, EPROM, etc.) or disk memory, and a processor 16 communicating with the memory device and with an analog receiver 18 and a digital receiver 20. As shown, the analog and digital receivers 18, 20 may respectively receive analog and digital broadcast and/or cable signals that carry analog and digital channels which are available in the area in which the TV 12 is located. The TV 12 may be made by Sony.

A remote control device 22 may also be provided to wirelessly communicate with the processor 16 in accordance with TV remote control principles known in the art. The remote control device 22 may include user-manipulable keys or buttons arranged in a keypad or button array 24. The keys or buttons can include alpha-numeric keys or buttons as well as directional keys or buttons useful for navigation through a user interface. Similar controls may also be provided on the chassis of the TV 12.

Figure 2:
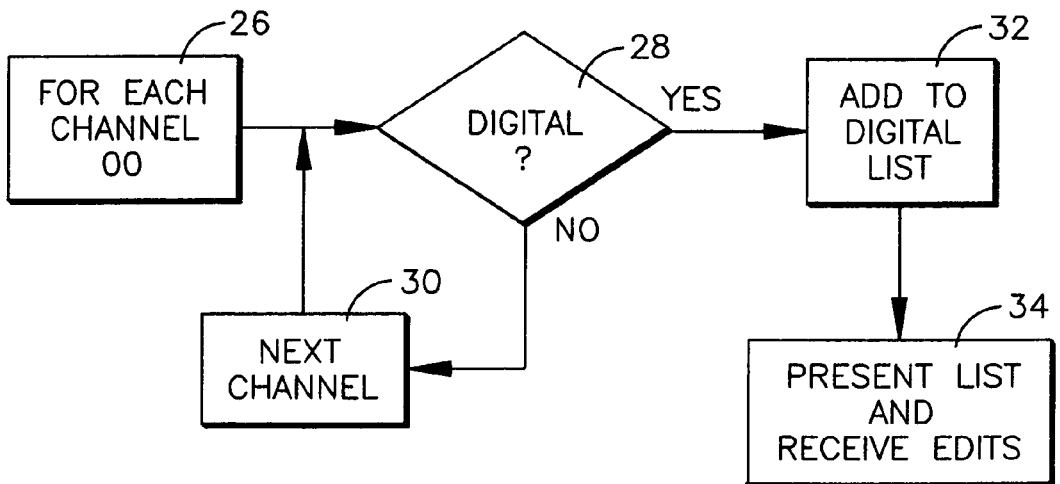
FIG. 2 is a flow chart of exemplary logic for generating and using the edit list.

FIG. 2 shows the present logic. Commencing at block 26, for each available channel on, e.g., a channel map that has been generated by autoprogramming and stored in the memory 14, the logic moves to decision diamond 28 to determine whether the channel is digital. This can be done, for instance, simply by determining whether the channel is received and processed by the digital receiver 20, or by the analog receiver 18. Or, a channel type designation may be stored in the channel map that has been generated during the autoprogramming step. The designation in the map may be accessed to make the determination at decision diamond 28.

If the channel under test is not digital, the logic retrieves the next available channel in the channel map at block 30, and then loops back to decision diamond 28. On the other hand, if the channel under test is digital, the logic adds the channel number to a digital channel edit list at block 32. The list is stored in the memory 14 and subsequently can be displayed at block 34 so that a user can manipulate the remote control device 22 to navigate through the list and edit the channels in accordance with channel editing principles. The list can include, if desired, station logos next to the associated channel numbers.

For instance, the user can designate a channel on the edit list for entry on a favorite channel list that is stored in the memory 14 and that subsequently can be displayed on the TV 12 with other favorite channels. Or, the user can designate a channel for entry on a channel skip list that is stored in the memory 14, so that when the user subsequently scrolls through the available channels on the channel map, channels in the skip list are not tuned to but rather are skipped over. Instead of a skip list, if desired a bit that is associated with the channel can be flipped to indicate that the channel is to be skipped. Still further, channels on the edit list can be labelled by a user so that when the channels subsequently are displayed on, e.g., an EPG, the channel labels (which can be network names, network logos, etc.) also appear next to the channels.

FIG. 1 shows an exemplary digital channel edit list 36, showing only digital channel numbers. Specifically, analog terrestrial broadcast channels 2-69 (for U.S. broadcast, 2-83 for Canada) are not shown on the edit list 36, regardless of whether they are available as indicated on the channel map generated by autoprogramming. Likewise, analog cable channels 100-125 are not shown on the edit list 36, regardless of whether they are available as indicated on the channel map generated by autoprogramming, and so on. Instead, only digital channel numbers are shown on the list 36.

Figure 3:
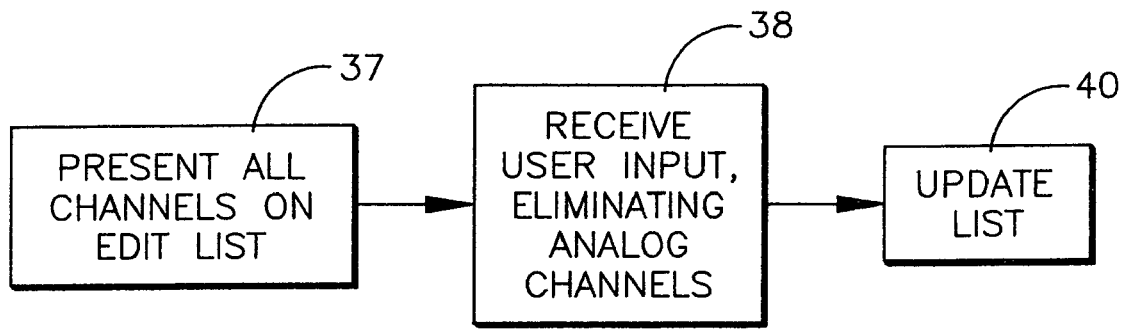
FIG. 3 is a flow chart of alternate logic, showing that the edit list can be modified by the user.
Figure 4:
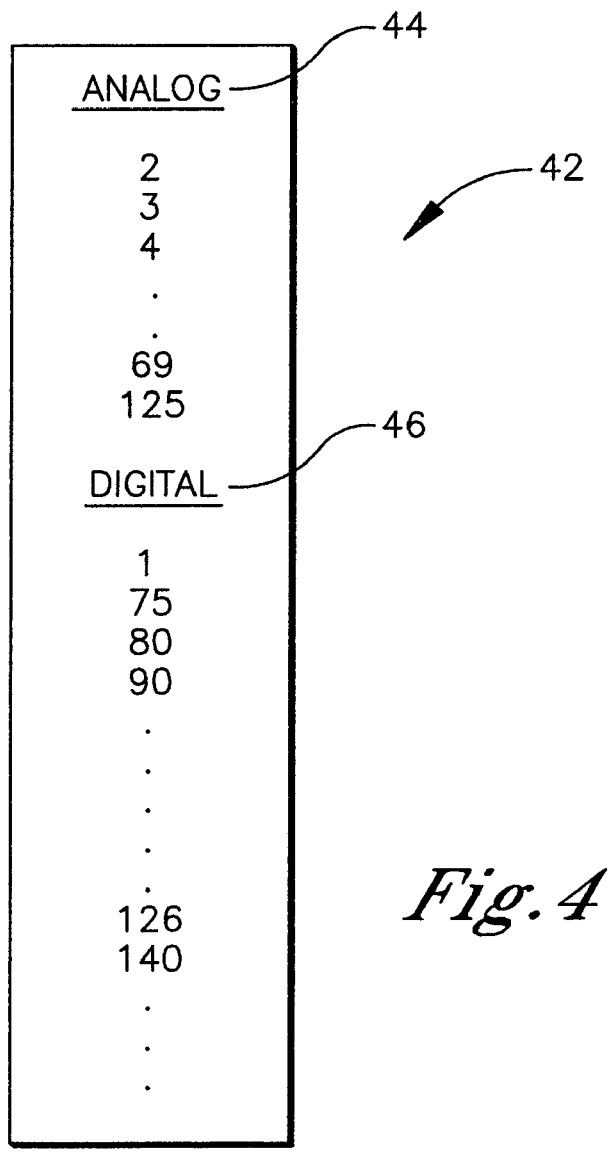
FIG. 4 is a schematic diagram of an alternate edit list.

FIGS. 3 and 4 show alternative embodiments to those disclosed above. Specifically, FIG. 3 shows that a user can establish the edit list, and FIG. 4 shows that the digital channel edit list can be part of a larger edit list that also displays analog channels, but grouped apart from the digital channels. In either case, the digital channel edit list permits only digital channels to be edited.

Commencing at block 37 in FIG. 3, all available channels, both analog and digital, may be presented to the user. At block 38, input from the user is received, with the input representing analog channels that the user would like to eliminate from the list. At block 40, the list is updated accordingly.

While FIG. 1 above shows that the edit list generated by the logic of FIG. 2 or FIG. 3 may entirely omit analog channels, FIG. 4 shows that the edit list of digital channels may be part of a larger channel list 42, which groups analog channels under an analog channel heading 44 and separately therefrom, digital channels under a digital channel edit list heading 46. That is, even though, e.g., analog channel 125 is numerically between digital channels 90 and 139, it is not listed between the digital channels in numeric sequence as it otherwise would be in a conventional edit list, but rather is grouped separately from the digital channels in what essentially is an analog channel list under the analog heading 44. All available digital channels are listed in numeric sequence without any intervening analog channel numbers under the digital heading 46 to establish a digital channel edit list. A digital channel number could include a decimal point, to the left of which is the number of a related analog channel and to the right of which is a digital sub-channel number.

While the particular SYSTEM AND METHOD FOR FACILITATING TV CHANNEL PROGRAMMING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A system, comprising:
   a TV;
   at least one analog receiver associated with the TV for receiving available analog channels;
   at least one digital receiver associated with the TV for receiving available digital channels; and
   at least one processor associated with the TV and coupled at least to the digital receiver for visually presenting on the TV a channel edit list displaying substantially all digital channels available to the TV for edit thereof by a user, the processor executing logic to generate the list by testing each channel on a channel map for whether the channel is digital and if so, adding it to the edit list, otherwise not adding the channel to the edit list.

2. The system of claim 1, wherein no analog channels are on the list.

3. The system of claim 2, wherein the list is useful for editing channels on the list.

4. The system of claim 3, wherein channels on the list can be designated for entry on a favorite channel list.

5. The system of claim 3, wherein channels on the list can be designated for entry on a channel skip list.

6. A system, comprising:
   a TV:
   means for presenting on the TV a list only of digital channels, regardless of whether analog channels are available for reception by the TV between digital channels on the list, the means for presenting testing each channel on a channel map for whether the channel is digital and if so, adding it to the list, otherwise not adding the channel to the list; and
   means for using the list to edit channels thereon.

7. The system of claim 6, wherein the means far presenting includes at least one processor.

8. The system of claim 6, wherein the means for presenting includes at least one processor coupled to at least one digital receiver and at least one analog receiver.

9. The system of claim 6, wherein the means for using includes at least one remote control device.

10. The system of claim 9, wherein the remote control device can be manipulated to scroll through the list and edit channels displayed thereon.

* * * * *